Jan. 8, 1924.
C. W. EPLEY
PORTABLE TABLE
Filed Oct. 18, 1922
1,480,052
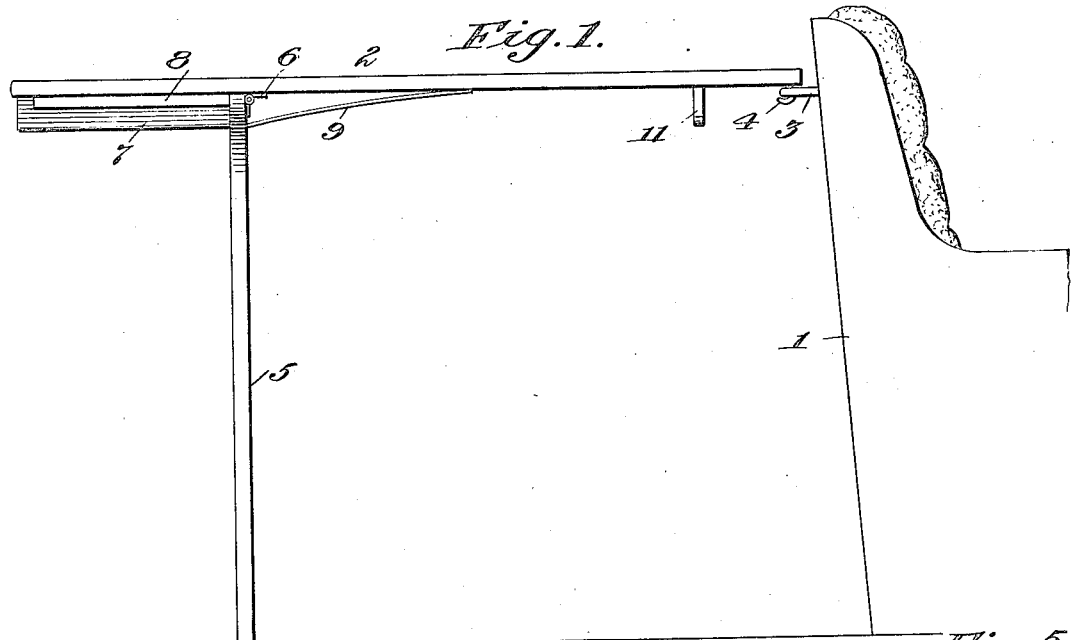
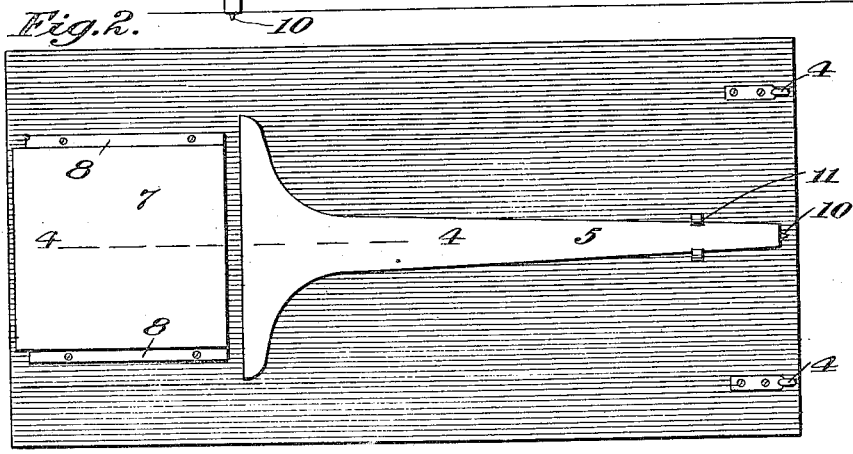
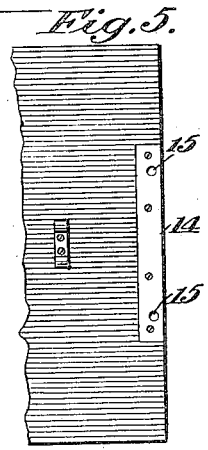
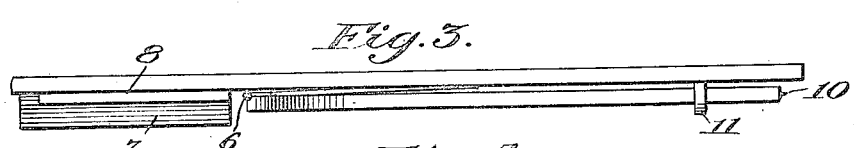
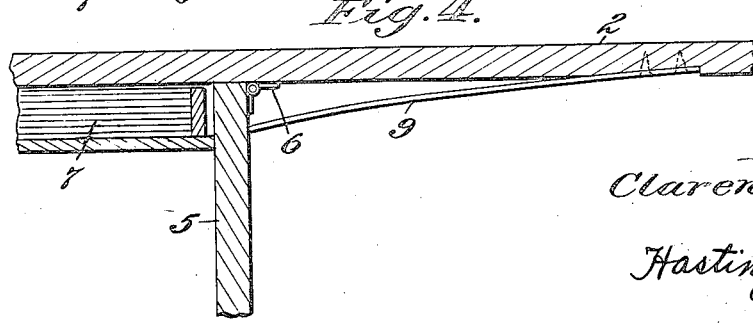
Inventor:
Clarence W. Epley,
Hastings W. Baker,
Att'y.

Patented Jan. 8, 1924.

1,480,052

UNITED STATES PATENT OFFICE.

CLARENCE WM. EPLEY, OF GETTYSBURG, PENNSYLVANIA.

PORTABLE TABLE.

Application filed October 18, 1922. Serial No. 595,328.

*To all whom it may concern:*

Be it known that I, CLARENCE WILLIAM EPLEY, a citizen of the United States, residing at Gettysburg, in the county of Adams and State of Pennsylvania, have invented certain new and and useful Improvements in Portable Tables, of which the following is-a specification.

This invention relates to a table which may be placed in the tonneau of an automobile and removably attached to the back of the front seat.

My invention embodies a table so designed and adapted that it may be compactly folded and placed under the rear seat of an automobile when the table is not in use, and may be quickly unfolded and attached to the rear part of the front seat when it is desired to use the same.

Obviously, however, such a table may be used in other places than in the tonneau of an automobile such as for instance in a Pullman car, in an office or at home.

Referring to the annexed drawings in which the same characters denote similar parts;

Figure 1 is a side elevation of my table at it would appear in the tonneau of an automobile.

Figure 2 is a plan view of the bottom thereof, showing the leg in its folded position.

Figure 3 is a side view of the table showing the leg in its folded position.

Figure 4 is a fragmentary sectional view on the line 4—4 of Figure 2.

Figure 5 is a fragmentary bottom plan view showing a modification of the attaching means.

Figure 6 is a side elevation view illustrating how the attaching means as shown in Figure 5 is applied to the rear seat of an automobile.

In the drawings 1 represents the front seat of an automobile to which my table 2 is attached. The upper side of this table is conventional or it may be provided with a groove to hold a pencil, neither the groove nor the pencil being shown however. Secured in the upper part of the front seat are eye bolts 3 adapted to receive hooks 4 attached to one edge of the table so that one side of the table is supported by means of the bolts and hooks. Intermediate the ends of the table is attached a foldable leg 5, by means of hinges 6 or other conventional means. A drawer 7 is mounted under the table in guide ways 8. A lock and key may be provided for the drawer. The drawer 7 has two functions, one of which is to hold playing cards or other articles and when the table is in use and the leg 5 is in a vertical position the drawer 7 acts as a means to steady the leg 5 and incidentally prevents the hinges 6 from being loosened by swinging the leg 5 rearwardly too far. This is clearly illustrated in Figure 4. A spring means 9 is provided on the opposite side of the leg 5 from the drawer 7, which spring means prevents the leg from being moved forwardly when in use. The drawer and the spring means abutting opposite sides of the leg 5 holds the leg in a perfectly upright position so that the table will be steady. A peg or pegs 10 are inserted in the bottom of the leg 5 which pegs engage the floor and act as an additional means of holding the leg 5 in its vertical position. By the above means a compact, light and portable table is provided which is very steady. When it is desired to fold the table the spring means 9 is pressed flat against the bottom of the table 2 as is shown in Figure 3, the table is then raised so as to disengage the pegs 1 from the floor, whereupon the leg 5 may be folded under the table and held in its folded position by means of the spring retaining means 11 which is shown as a spring clasp. If desired the spring means 9 may be countersunk in the bottom of the table 2 as is shown in Figure 4.

In Figures 5 and 6 a hinge 13 may be secured to the front seat of an automobile. A securing plate 14 is countersunk to the adjacent edge of the table opposite to the leg 5. The plate 14 may be secured to the table by means of screws or other conventional means. Nuts not shown may be embedded in the table above the plate 14 and in alignment with the holes 15 in the plate 14. A thumb screw 16 may be inserted through the holes in the hinge 13 in alignment with the holes 15 which thumb screw 16 by passing through the holes in the hinge 13 and the holes 15 and screwing into the nuts securely attach the table 2 to the front seat 1 of the table. Instead of embedding threaded nuts in alignment with the holes 15, I may internally thread the sides of the holes 15 so as to make a threaded engagement between the table and the thumb screw 16.

Obviously many modifications and changes might be made in this invention without departing from the spirit thereof. I do not therefore intend to limit myself to the specific structure shown.

What I claim as new and desire to have protected by Letters Patent is:

1. A portable and foldable table having means thereon for attaching one end thereof to the back of a seat and pivoted leg attached to the under side thereof adjacent the other end of said table, resilient means for maintaining said pivoted leg in vertical position, means on the end of said leg adapted to engage the supporting floor to prevent movement of the lower end of the leg and a drawer in the last mentioned end of said table, the drawer acting as a stop for said leg when said drawer is closed, said leg being adapted to be folded down against the under side of said table.

2. A portable and foldable table having means thereon for attaching one end thereof to the back of a seat and pivoted leg attached to the under side thereof adjacent the other end of said table, resilient means for maintaining said pivoted leg in vertical position, means on the end of said leg adapted to engage the supporting floor to prevent movement of the lower end of the leg and a drawer in the last mentioned end of said table, the drawer acting as a stop for said leg when said drawer is closed, the upper portion of said leg being extended so as to engage said drawer over its full width, said leg being adapted to be folded down against the under side of said table.

In testimony whereof I affix my signature.

CLARENCE WM. EPLEY.